US011971954B2

(12) United States Patent
Rothschild et al.

(10) Patent No.: US 11,971,954 B2
(45) Date of Patent: Apr. 30, 2024

(54) RANDOM WALKS TO DETECT DISSIMILAR RECORDS (71) Applicant: EMC IP Holding Company LLC, Hopkinton, MA (US)

(72) Inventors: Seth Jacob Rothschild, Littleton, MA (US); Alex Robbins, Cambridge, MA (US); Nicole Reineke, Northborough, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 532 days.

(21) Appl. No.: 17/199,965

(22) Filed: Mar. 12, 2021

(65) Prior Publication Data
US 2022/0292305 A1    Sep. 15, 2022

(51) Int. Cl.
G06F 18/214    (2023.01)
G06F 16/901    (2019.01)
G06F 16/9038   (2019.01)
G06F 18/22     (2023.01)
G06F 18/2323   (2023.01)
G06F 18/24     (2023.01)

(52) U.S. Cl.
CPC ........ G06F 18/214 (2023.01); G06F 16/9024 (2019.01); G06F 16/9038 (2019.01); G06F 18/22 (2023.01); G06F 18/2323 (2023.01); G06F 18/24 (2023.01)

(58) Field of Classification Search
None
See application file for complete search history.

(56) References Cited

U.S. PATENT DOCUMENTS

| | | | | |
|---|---|---|---|---|
| 8,498,999 B1* | 7/2013 | Bhalotia | ............... | G06F 40/157 707/767 |
| 8,977,649 B1* | 3/2015 | Hassidim | ........... | G06Q 30/0282 709/200 |
| 10,671,672 B1* | 6/2020 | Eksombatchai | ...... | G06F 16/435 |
| 11,740,561 B2* | 8/2023 | Mehta | ................. | G03F 7/70591 355/67 |
| 2008/0222726 A1* | 9/2008 | Chayes | ................. | G06F 16/951 726/23 |
| 2017/0364586 A1* | 12/2017 | Krishnamurthy | ... | G06F 16/3329 |
| 2023/0126032 A1* | 4/2023 | Swerdlow | ......... | H04M 3/53383 455/413 |

OTHER PUBLICATIONS

Boobalan et al., "Graph clustering using k-Neighborhood Attribute Structural similarity," Applied Soft Computing, 47 (2016) 216-223 (Year: 2016).*
Panda et al., "Scalable Video Summarization using Skeleton Graph and Random Walk," 2014 22nd International Conference on Pattern Recognition (Year: 2014).*
Wang et al., "Review of Random Walk in Image Processing," Arch Computat Methods Eng (2019) 26:17-34 (Year: 2019).*

* cited by examiner

Primary Examiner — Soo Shin
(74) Attorney, Agent, or Firm — Workman Nydegger (57) ABSTRACT One example method includes identifying dissimilar items in a data set. A data set may be walked one or more times and the nodes or vertices of the data set may be scored based on the number of times the nodes are touched during the walks. Scores below a threshold score are determined to be dissimilar nodes in the data set. This allows a diverse set of nodes to be identified. A dissimilar data set may be used to prevent unintentional bias in algorithmic training.

18 Claims, 6 Drawing Sheets

RANDOM WALKS TO DETECT DISSIMILAR RECORDS

FIELD OF THE INVENTION

Embodiments of the present invention generally relate to data management and related operations. More particularly, at least some embodiments of the invention relate to systems, hardware, software, computer-readable media, and methods for detecting dissimilar records in a dataset.

BACKGROUND

A data set is generally a set or collection of data. The data set may take various forms such as a set of objects, a set of files, a set of records, a set of items, or the like. For example, a data set may be a set of audio files, a set of image files, a set of documents, or the like. Data sets can be represented as a graph structure where the nodes represent the data and the edges may represent relationships between the nodes.

One of the challenges associated with a data set is to determine which of the nodes in the dataset are similar to each other. There are various clustering algorithms and similarity metrics that can be calculated from graph structures when attempting to identify similar nodes. Stochastic methods with probabilistic results have an advantage in that the underlying distribution only needs to be sampled. In the context of identifying similar nodes, an explicit computation can be compared to random methods. The tradeoff is that the explicit computation is associated with high cost and complete certainty while the random methods sacrifice certainty for time.

While much time has been spent discovering methods to identify similar records in a dataset, the ability to find dissimilar records presents a different problem. While several approaches can be taken, the results are not satisfactory and may be unreliable or too expensive computationally.

For example, it is possible to find the nodes that have the furthest distance, using the graph metric, from each other. However, computing all of the pairwise distances on a graph is very expensive computationally.

Alternatively, a non-graph metric or score can be applied to the nodes in the graph and the ones which score the highest pairwise can be selected. While this approach is less expensive computationally, this approach is highly dependent on the selected metric or score and, by design, ignores the underlying graph relationships and structure.

In another example, a clustering algorithm can be performed and a random representative from each cluster can be selected. However, this approach does not guarantee that the nodes are unrelated because the clustering algorithm is only optimized to find nodes that are similar.

In another example, it is possible to find the connected components of a graph and choose one representative for each component. In this example, it is possible to find as many representatives as there are connected components. However, as new relationship types are added, the number of connected components decreases, which reduces the number of representatives that can be found. This renders this approach quite ineffective.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data management and related operations. More particularly, at least some embodiments of the invention relate to systems, hardware, software, computer-readable media, and methods for identifying dissimilar items in a dataset, providing burden of proof for dissimilar data sets, reducing bias in data sets used in algorithm training, and the like or combination thereof.

By way of example and not limitation, a dataset is a set of data that can be represented in graph form or in a graph structure. The data in a data set can take various forms (e.g., records, objects, items, files, metadata, blocks, or the like). In graph form, the data of a data set is represented as or included in the nodes or vertices of the graph. Graphs may be generated from a data set or may exist in a database.

Generally, a graph is a data structure that includes nodes (or vertices) and a set of edges connecting the nodes. A graph G can be defined by vertices V and edges E. Thus, the graph G=(V,E). For example, a graph may be constructed where each node or vertex of the graph includes or represents an abstract of an article and each edge represents two articles that share an author. Edges may also have weights, which may be values that are assigned to the edges. For example, the nodes of a graph may represent cities and the edges may each represent two cities that are related by a distance. The weight of an edge between two cities is the distance. Graphs may have different types, including directed and undirected.

In general, example embodiments of the invention relate to processing graphs to find dissimilar items. In one example, by finding dissimilar nodes in a data set, embodiments of the invention allow a diverse set of nodes to be identified for algorithm training. A machine learning model, for example, will likely be trained better when trained with more diverse training data. More specifically, algorithm training, including machine learning, is challenging at least because there is a possibility of causing unintentional bias. A data set that is too similar may bias the algorithm in some direction.

More specifically, when using a defined data set, bias may be introduced into algorithms that perform against the data set. For example, introduced bias in image recognition may lead to failure in recognizing some subset of images. In another example, this may lead to an unintentional negative impact against people or personal data in the form of non-positive weighting (e.g., resume ranking). From this perspective, a programmatically diverse set of data is critical to combat bias and prevent bias from being introduced in algorithm training.

Further, even though a data scientist may know a category on which their data might be biased, it is difficult to construct a sample subset that adequately represents the possible options. Users may desire to specify record keyword or theme criteria and a setting on performing a non-bias data set gathering operation.

Embodiments of the invention, by identifying dissimilar records, reduce the possibility of introducing bias. Embodiments of the invention, for example, may ensure that the training data set includes a diverse set of records. Further, embodiments of the invention allow the efforts taken to generate a diverse data set be stored. The efforts are reviewable.

Figure 1:
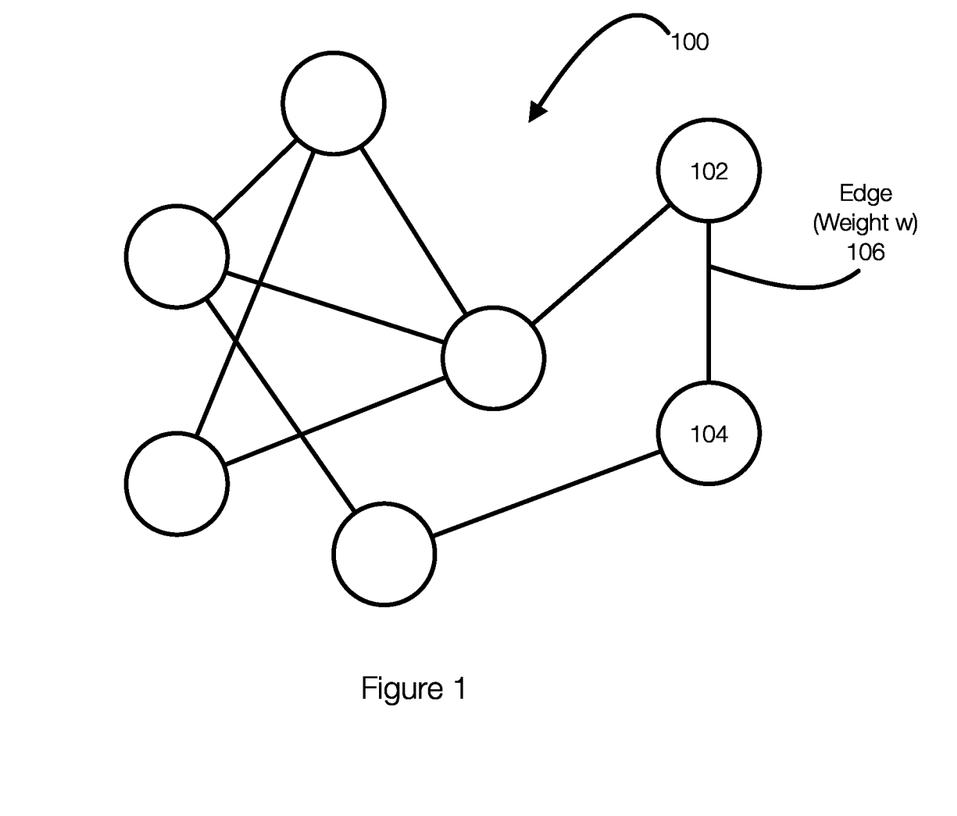
FIG. 1 discloses aspects of a graph.

FIG. 1 illustrates an example of a graph. The graph 100 is an example of a data structure that may include nodes (the terms nodes and vertices are used interchangeably herein) represented by nodes 102 and 104. The nodes in the graph 100 are connected by edges, represented by the edge 106. For example, the nodes 102 and 104 are connected by the edge 106. The edge 106 may have a value or a weight w. The weights of the edges in the graph 100 may be different. Embodiments of the invention are configured to identify dissimilar nodes in the graph 100.

Figure 2:
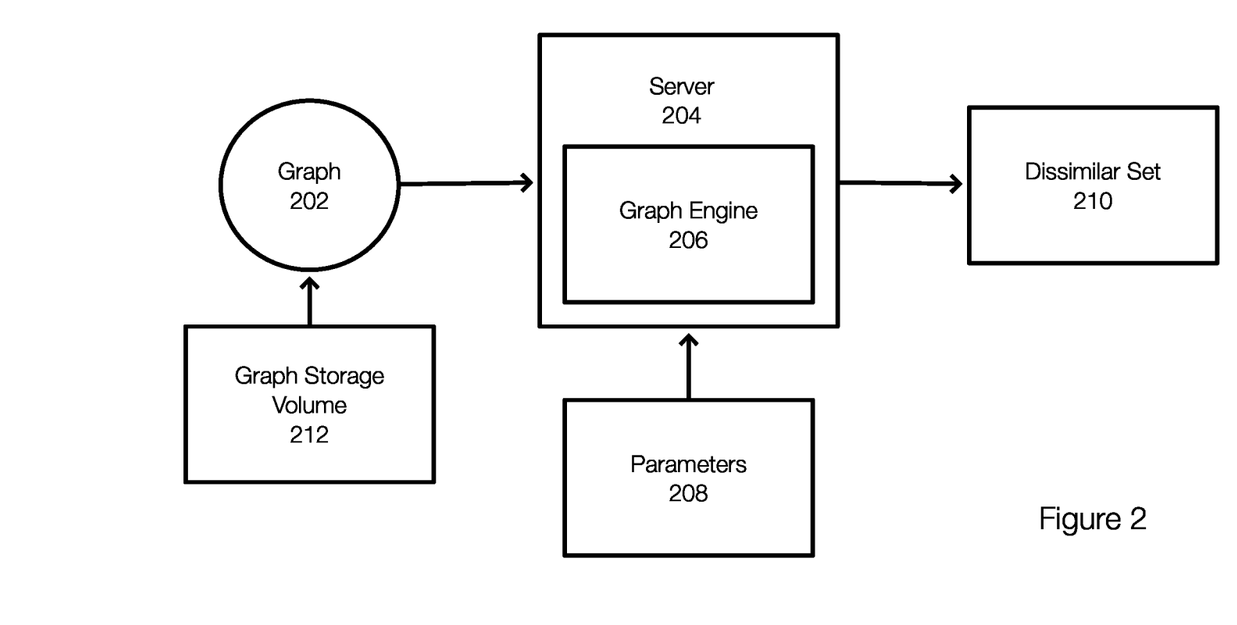
FIG. 2 discloses aspects of a graph engine configured to generate dissimilar data sets.

FIG. 2 illustrates an example of a graph engine configured to identify dissimilar nodes in a graph. More specifically, FIG. 2 illustrates a graph engine 206 operating on a server 204. The server 204 may include a processor, memory, and other hardware necessary to receive and process a graph. The server 204 may be cloud-based, local, virtual, containerized, or the like. The graph engine 206 is configured to receive a graph 202.

The graph 202 may be associated with a graph storage volume 212 configured to store data sets. The data sets may already be configured as graphs. Alternatively, a graph may be generated from a particular data set as needed. The graph engine 206 may present a user interface that allows a user to browse and/or search the graph storage volume 212 to select a data set. The graph engine 206 may also allow a user to enter criteria that can be used to search the graph storage volume 212. A sorted or ranked list of data sets may be returned to the user and the user may select one of the data sets or graphs for further processing.

The graph engine 206 is configured to process the graph 202 to identify or generate a dissimilar set 210 of data. The nodes (or data) in the dissimilar set 210 are diverse with respect to each other.

The graph engine 202 may process the graph 202 by walking the graph. The walk may have n steps. In fact, the graph engine 202 may perform multiple walks. In one example, multiple walks of n steps may be performed from more than one node in the graph. The number n may be defined by a user, by default, based on the size of the graph or number of nodes in the graph, or the like or combination thereof.

More specifically, when the process of identifying dissimilar nodes or vertexes in the graph begins, the graph engine 206 may select a random vertex in the graph 202. Multiple walks are then performed from the selected vertex. In each walk, one of the edges of that vertex is selected (e.g., randomly) and the graph engine then walks to a new vertex connected to the selected edge. This process is repeated until n steps have been taken. Each vertex touched by during the multiple walks is stored. The vertices touched by the multiple walks can be scored during and/or after multiple walks.

In one example, the score of a particular vertex relates to the number of times that particular vertex was visited as the multiple walks were performed. After the walks are completed for the selected vertex, the scores of the vertices can be used to identify dissimilar vertices with respect to the selected vertex. In other words, a set of dissimilar data can be identified from the graph 202. For example, if the graph 202 represents a set of images, the graph engine 206 may identify dissimilar images that can be used for various purposes, including algorithmic training. Often, the number of items in the dissimilar data set may be sufficiently large for algorithmic training. Advantageously, a dissimilar data set can prevent bias from being unintentionally introduced and can improve ethic parameters. Although the dissimilar data set can be generated from the multiple walks performed from the selected vertex, the dissimilar set is generally generated after performing multiple walks of n steps from multiple vertices.

More specifically and by way of example only, consider an undirected graph G with vertices $\{v_i\}$. In this example, edges in the graph between vertices $v_i$ and $v_j$ are noted as $e_{ij}$ and each edge has a positive real number weight $w_{ij}$. The weight may amplify the likelihood of choosing that edge when randomly walking from $v_i$ to $v_j$. The edge $e_{ij}$ is not required to exist for every $v_i$ and $v_j$.

Figure 3:
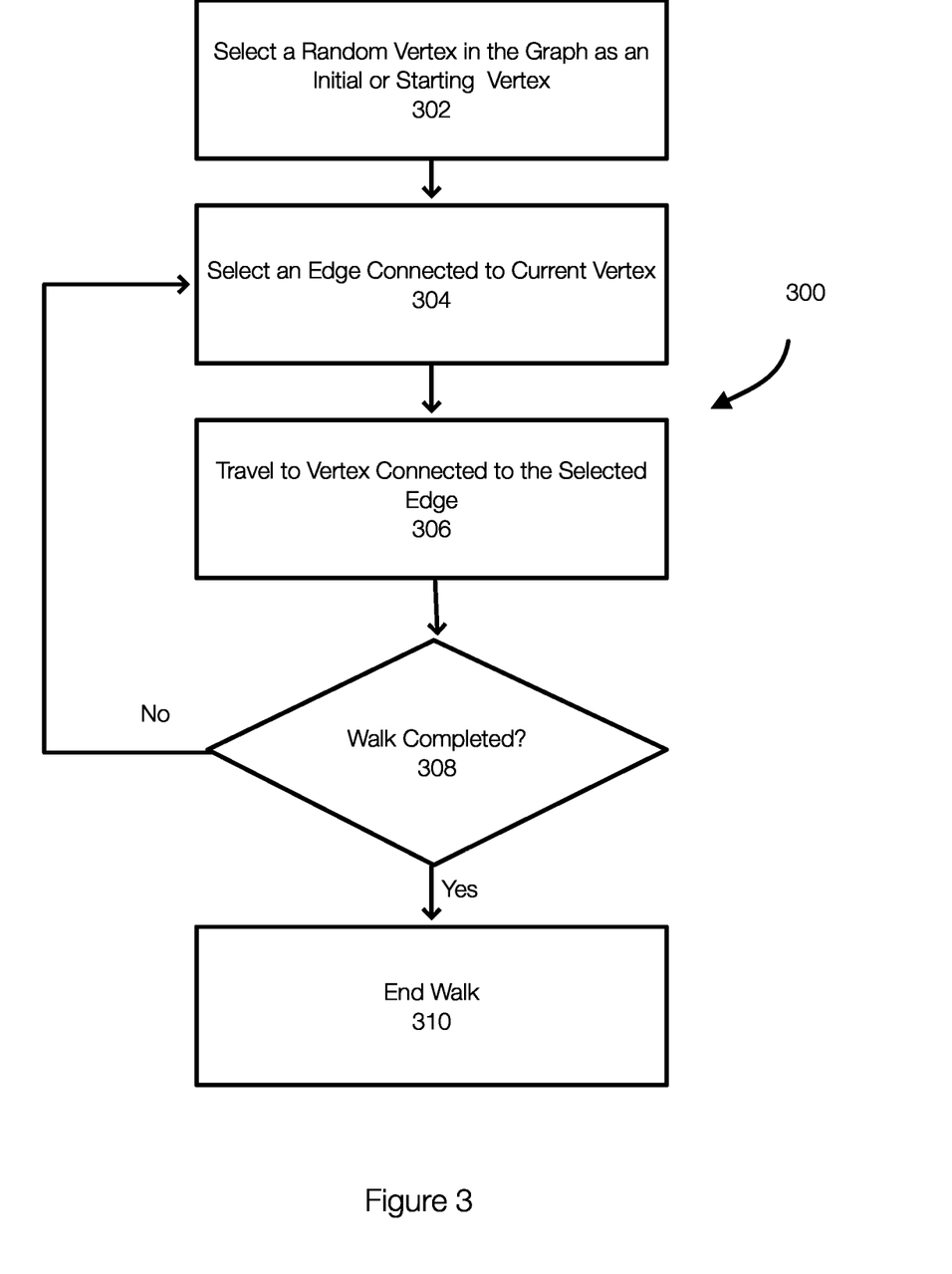
FIG. 3 discloses aspects of walking a graph.

FIG. 3 discloses aspects of a performing a walk in a graph. The method 300 illustrates how a single random walk may be performed in the graph G.

The method 300 may begin by selecting 302 a vertex $v_i$ in the graph G. This initial or starting vertex $v_i$ can be selected in any manner including randomly. Next, an edge $e_{ij}$ is selected from the edges connected to the selected vertex. The edge $e_{ij}$ may be selected randomly. In one example, if the set of all weights for edges attached to $v_i$ is $W_i$, then the likelihood of choosing the edge $e_{ij}$ is given by:

$$\frac{w_{ij}}{\sum_{w \in W_i} w}$$

Once the edge $e_{ij}$ is selected, the method walks 306 to the vertex ($v_j$) connected to the current vertex ($v_i$). The vertex $v_j$ becomes the current vertex. If the walk is completed 308 (n steps have been performed), the walk may terminate. If the walk is not completed, the method returns to selecting 304 an edge connected to the current vertex. These steps continue until the walk of the graph is completed and n steps have been performed.

Although FIG. 3 illustrates a single walk, embodiments of the invention typically perform m walks from the selected vertex $v_i$. The vertices that are identified as dissimilar to the selected vertex are determined from multiple walks in one embodiment.

Figure 4:
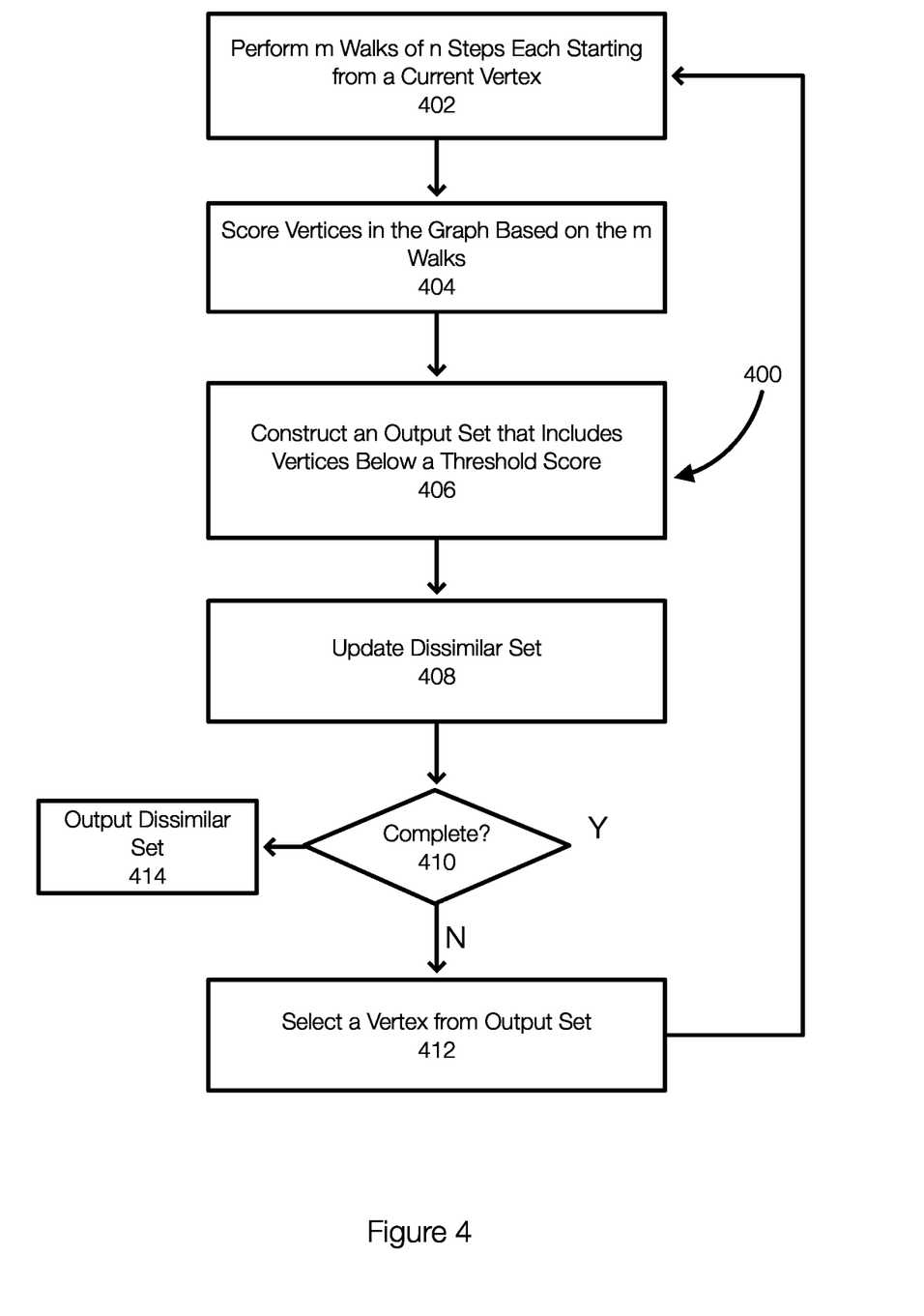
FIG. 4 discloses aspects of walking a graph to identify dissimilar nodes or vertices in a graph.

FIG. 4 discloses aspects of a method for scoring nodes in a graph G or for identifying a set of dissimilar vertices in the graph G. The method 400 includes performing a collection of walks (e.g., m walks of n steps) from certain vertices. Each walk in the collection of walks may be performed as illustrated in FIG. 3. For each collection of walks, the vertices can be scored and the dissimilar set is ultimately generated based on these scores. In one example, when a new starting vertex is selected for another collection of walks, the scores may be reset.

More specifically, a vertex in the graph is selected when the method is started and the selected vertex is deemed the current vertex. In the method 400, m walks of n steps may be performed 402 in the graph G from the current vertex. In one example, the values of m and n and may be set by a user, by default, based on the size of the graph, on characteristics of the graph or the like or combination thereof. The number of steps n may vary from one walk to another walk. For example, m and n may be equal to or greater than 1. In one example, the number of walks m is much greater than the number of steps n. For example, m may be greater than 1000, greater than 10,000, or the like while n may be less than 10 or less than 6. When m is large, the results tend to have more certainty in one example.

The vertices visited during the collection of walks from the current vertex are scored. In one example, the score of each vertex is cumulative for the collection of walks that began at the current vertex. In one example, the number of times a node is visited is tracked across the collection of walks. This allows the vertices to be scored 404 as follows:

$$s(v_j) = \frac{\{\text{number of times landed on } v_j\}}{n \cdot \{\text{number of walks}\}}$$

In one example, $s(v_j)$ represents how often a vertex is visited relative to the total steps taken. In this example, the score of each vertex will be greater than or equal to 0 and less than or equal to 1 using this formula. In one example, vertices that are not visited during any of the walks may be given a score of 0. The scores of all vertices sum to 1 and the scores represent a percent of time the walks are on a given node. Once the vertices are scored for the current collection of walks, an output set is constructed 406 that includes all vertices whose score is below a threshold score. In one example, the output set of vertices whose scores are below the threshold score may be referred to as $V_{far}$ as the set represents vertices that are dissimilar with respect to the current vertex Once $V_{far}$ is determined, the dissimilar set is updated 408 to include the current vertex. In other words, the first vertex included in the dissimilar set is the current vertex from which the collection of walks originated. If the process is completed 410, the dissimilar set 414 is generated. If the process is not completed 410, a vertex is selected 412 from the set of vertices generated by the initial collection of walks ($V_{far}$) and the process is repeated.

More specifically, a collection of walks is then performed beginning at the newly selected vertex, which is now the current vertex. By scoring the vertices based on the collection of walks starting from the current vertex, another set of vertices $V_{far}$ associated with the current vertex can be generated.

An intersection is then performed between the current $V_{far}$ and the most recent $V_{var}$ to create a new $V_{far}$. Another collection of walks may be performed by selecting a vertex included in the new $V_{far}$. This process may be performed a predetermined number of times or until the intersection of $V_{far}$ sets is empty (no vertices are in $V_{far}$).

After each collection of walks, the dissimilar set is updated 406 to include the vertex from which the collection of walks originated. If the desired number of samples has been obtained in the dissimilar set or there are no vertices in the set $V_{far}$, the method ends and the dissimilar set is output 414. Otherwise, a vertex $v_j$ is selected 412 from the current set $V_{far}$. The vertex $v_j$ is set as the current vertex and the method is repeated by performing 402 a collection of m walks of n steps starting from the current vertex (which is now $v_j$).

During this second and subsequent iterations of the method 400, the set $V_{far}$ is updated by taking an intersection of the set $V_{far}$ generated from the current collection of walks and the most recent $V_{far}$. The intersection becomes the new $V_{far}$. This process continues until the number of desired samples is obtained.

In one example, the first collection of walks may begin from a current vertex, which may be a vertex selected at random. Subsequent collections of walks typically begin from one of the vertices in the set $V_{far}$ generated from the previous collection of walks. The vertices in the set $V_{far}$ each have a score below a threshold score from the corresponding collection of walks.

Thus, as the method 400 is performed, the set of dissimilar vertices includes the starting vertex in one example. After the first walk the output set may be $\{v_i\}$. After the second walk, the output set is updated to be $\{v_i, v_j\}$, where $v_j$ was included in the initial output set $V_{far}$. In one example, each collection of walks may generate a sample to include in the set of dissimilar vertices. Thus, the set of dissimilar vertices typically includes one of the vertices identified as dissimilar from each collection of walks. As previously stated, the method 400 may be repeated until sufficient samples are present in the dissimilar set or until no vertices are present in the output set $V_{far}$ after performing the intersection.

Figure 5:
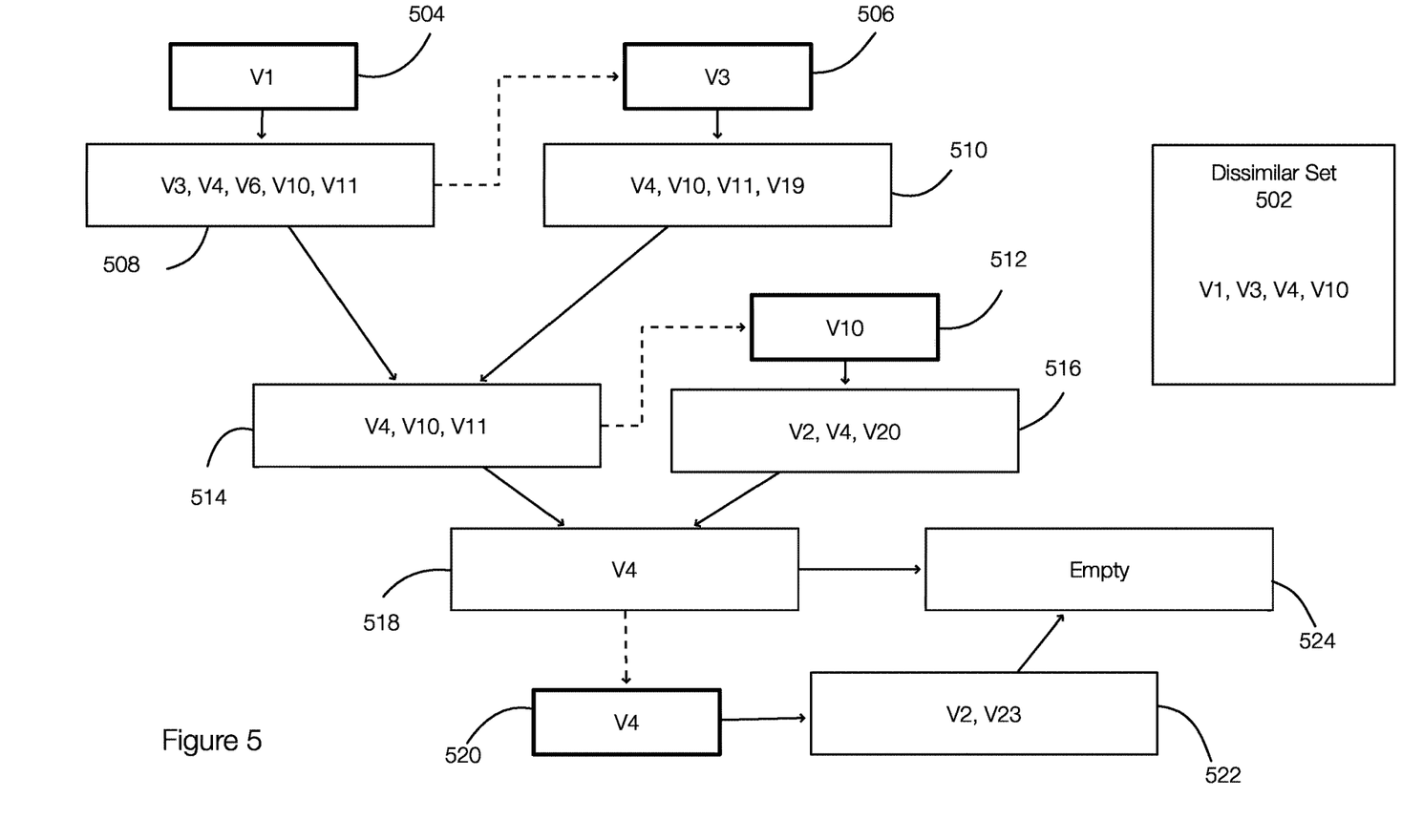
FIG. 5 discloses aspects of identifying dissimilar nodes in a graph.

FIG. 5 illustrates the process of generating a dissimilar set. In FIG. 5 a collection of walks is performed from a starting vertex 504 V1. During the walks, the initial set $V_{far}$ 508 is generated, which includes vertices V3, V4, V6, V10, and V11. The starting vertex 506 V3 for the next collection of walks is selected from the $V_{far}$ 508. In this example, the vertex V3 is selected from the $V_{far}$ 508 (e.g., randomly or in another manner) and a collection of walks is performed starting from the vertex V3 506. The $V_{far}$ 510 for the vertex V3 resulting from collection of walks starting from V3 includes vertices V4, V10, V11, and V19.

A new $V_{far}$ 514 is generated from the intersection of $V_{far}$ 508 and $V_{far}$ 510. The $V_{far}$ 514 includes vertices V4, V10, and V11. The next collection of walks is performed starting with a vertex selected from the most recent $V_{far}$ 514. In this example, vertex 512 V10 is selected. The $V_{far}$ 516 for the collection of walks starting with vertex 512 includes vertices V2, V4, and V20.

Next another intersection is performed between $V_{far}$ 514 and $V_{far}$ 516 to generate a current $V_{far}$ 518 that includes vertex V4. The next walk thus begins with the vertex 520 V4 and results in $V_{far}$ 522 that includes vertices V2 and V23.

Next, another intersection is performed between $V_{far}$ 518 and $V_{far}$ 522. The intersection results in a $V_{far}$ that is empty 524. In this example, the process ends and the dissimilar set 502 is output. The dissimilar set 502 includes the vertices V1, V3, V4, and V10. After each collection of walks, the starting vertex for the corresponding collection of walks was added to the dissimilar set 502.

In one example, in order to take a random walk, there is an assumption that every vertex has at least one edge. If a vertex does not have any edges, the vertex can be treated as sufficiently far from all other vertices and may be included as a sample in the dissimilar set. Alternatively, the vertex could be treated as an outlier and discarded depending on the use case. Both scenarios are within the scope of embodiments of the present invention and the inclusion or exclusion of the vertex may depend on circumstances or use case.

In another example, it is possible to find small subgraphs where taking an extended random walk is not productive. For example, in a connected graph with only two vertices, no score will be lower than 30%. In cases like this, a prolonged random walk can be avoided because it will become apparent that all nodes will be above the threshold.

Because the results are probabilistic, it is possible to identify a vertex (e.g., vertex $v_3$) that is below the threshold for vertex $v_4$ while, at the same time, the vertex $v_4$ is above the threshold for vertex $v_3$. In this case, the results for $v_4$ and $v_3$ may be merged and only include one of these vertices in the sample set. If this happens often, the number of walks can be increased.

Figure 6:
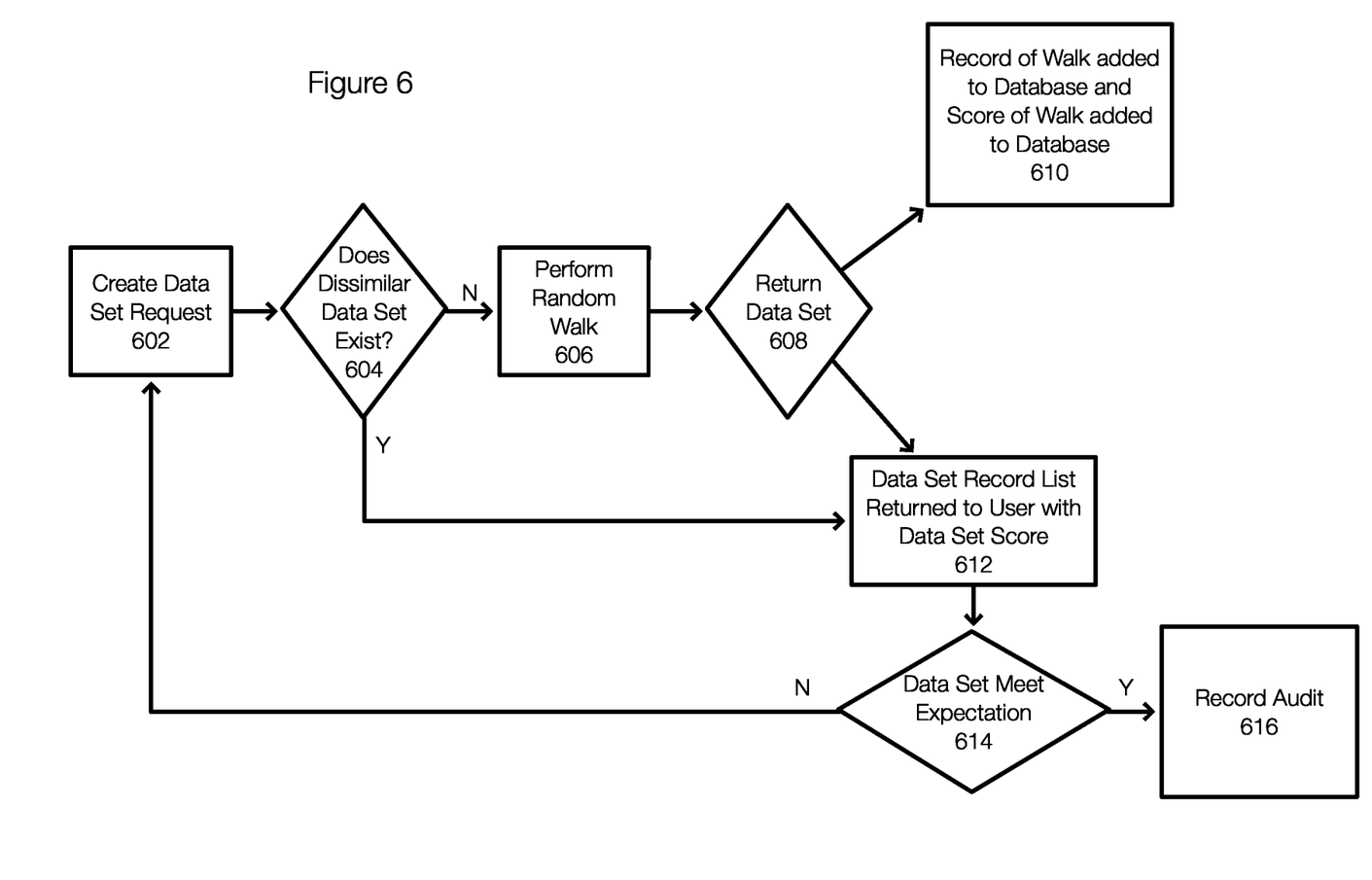
FIG. 6 discloses aspects of data management using dissimilar data sets.

FIG. 6 discloses aspects of a method for managing data sets including dissimilar data sets. Embodiments of the invention may generate data sets that can be used to encourage non-bias in algorithm training and in other scenarios.

For example, a data set request may be created or generated 602 by a user. As previously described, the request may be associated with various parameters or factors such as keyword, criteria, score, non-bias. A determination 604 is made as to whether the requested data set exists in a database. More specifically, a determination 604 is made as to whether a dissimilar data set exists.

If a dissimilar data set or sets exist (Yes at 604), a data set record list is returned 612 to the user along with a score (e.g., of relatedness). The score may be used for ordering. The user may select a data set from the list. If the data sets do not meet expectation, this information may be used to update the database of data sets and a new list of data sets may be returned to the user.

More specifically, feedback is possible. A user may be able to indicate whether the data set (e.g., the data set selected by the user) meets 614 the user's expectations. For example, the user may be able to give a star rating, a numerical rating, a thumbs up, or the like. This information is returned and may be used in a weighting mechanism to score the data sets. A new list may be returned to the user if necessary. Alternatively, the feedback may simply be stored and considered the next time a list of related data sets is generated.

If the dissimilar data set does not exist (No at 604) a dissimilar data set may be generated from a data set 606 as described herein and a dissimilar data set is returned 608. Thus, the walks are performed as described herein, the dissimilar data set is returned 612, and a record of the walk and/or the dissimilar data set is added 610 to the database. The score may also be added to the database.

In one example, an entry is made in the database indicating that a list of potential data sets were identified 612 or generated. The data sets returned in response to the request may also be associated with a score or may be ranked.

An audit record may also be generated 616. This allows information to be retained related to data sets accessed, data sets created, who accessed/created the data sets, when the data sets were accessed created, why the data sets were accessed/created, or the like or combination thereof.

Embodiments of the invention allow dissimilarities to be identified in a data set. The dissimilar data sets can be stored and, using an audit trail, the efforts made to find a sufficiently diverse set of records can be recorded. Further, this allows a relative ranking to measure ethical or bias progress.

Embodiments of the invention allow users to specify the edges used to draw the edges of the graph, the number of desired data sets to output, the threshold for which data is considered unrelated or dissimilar, and the like.

Consider the following pseudocode for a module with a class Graph for calculating the scores from random walks. In this example, a graph G is calculated where the vertices are papers, and the edges represent the papers sharing words in the abstract where the weight of the edge is the number of words shared. Embodiments of the invention can find, by way of example only, 20 very different papers out of a set of 6000 IEEE papers. The number of samples could be increased by decreasing the size of the neighborhood (given by n steps) or by increasing the threshold.

The pseudo code is as follows:

```
G=Graph(df["doi"], df["abstract"])
desired_samples=50
threshold=0.0001
samples=[ ]
random_node=G.get_random_node( )
samples.append(random_node)
far_vertices=set(G.graph.keys( ))
while len(samples)<desired_samples:
    if len(far_vertices)==0:
        break
    scores=G.compute_random_walks(
    samples[-1], nsteps=8, ntrials=1000
    )[samples[-1]]
    new_vertices={doi for doi in G.graph.keys( )
        if score_or_zero(scores, doi)<threshold}
    far_vertices=far_vertices.intersection(new_vertices)
    samples.append(random.choice(list(far_vertices)))
    far_vertices.remove(samples[-1])
```

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations including graph and graph related operations. These operations may include generating a set of dissimilar items from a data set or from multiple data sets. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted with that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: performing a collection of walks in a graph starting from a current vertex, wherein the graph represents a data set, scoring vertices in the graph based on the collection of walks such that each vertex in the graph has a score, wherein the score of each vertex reflects how often each vertex was visited during the collection of walks relative to the other vertices, constructing a dissimilar set that includes vertices whose scores are below a threshold score, and outputting the dissimilar set that identifies dissimilar vertices in the graph.

Embodiment 2. The method of embodiment 1, further comprising including the current vertex in the dissimilar set, selecting a vertex from a far set for the current vertex, wherein the far set includes all vertices whose score is less than the threshold score, and performing a collection of walks starting with the selected vertex to generate a second far set, wherein the second far set includes all vertices whose score is below the threshold score for the collection of walks started with the selected vertex.

Embodiment 3. The method of embodiment 1 and/or 2, further comprising: intersecting the far set with the second far set to generate a current far set that includes an intersection of the far set and the second far set, selecting a vertex from the current far set, and performing a collection of walks starting from the vertex selected from the current far set.

Embodiment 4. The method of embodiment 1, 2, and/or 3, further comprising performing collections of walks from vertices selected from the current far set until the current far set is empty or the dissimilar set includes a predetermined number of vertices.

Embodiment 5. The method of embodiment 1, 2, 3, and/or 4, maintaining an audit trail identifying efforts made to find a sufficiently diverse dissimilar set of vertices.

Embodiment 6. The method of embodiment 1, 2, 3, 4, and/or 5, further comprising searching a database for the graph.

Embodiment 7. The method of embodiment 1, 2, 3, 4, 5, and/or 6, further comprising specifying parameters for searching the database, the parameters including attributes of edges, data type, number of samples to include in the dissimilar set, the threshold value, or combination thereof.

Embodiment 8. The method of embodiment 1, 2, 3, 4, 5, 6, and/or 7, further comprising creating a relative ranking for the dissimilar set to measure ethical or bias progress.

Embodiment 9. The method of embodiment 1, 2, 3, 4, 5, 6, 7, and/or 8, further comprising assigning a score of 0 to all vertices never touched by the walk.

Embodiment 10. The method of embodiment 1, 2, 3, 4, 5, 6, 7, 8, and/or 9, further comprising performing algorithmic training using the dissimilar data set Embodiment 11. A method for performing any of the operations, methods, or processes, or any portion of any of these or of these embodiments, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein In one non-limiting example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

performing a collection of walks in a graph starting from a current vertex, wherein the graph represents a data set;

scoring vertices in the graph based on the collection of walks such that each vertex in the graph has a score, wherein the score of each vertex reflects how often each vertex was visited during the collection of walks relative to the other vertices;

constructing a dissimilar set that includes vertices whose scores are below a threshold score;

outputting the dissimilar set that identifies dissimilar vertices in the graph, wherein the current vertex is included in the dissimilar set;

selecting a vertex from a far set, wherein the far set includes all vertices whose score is less than the threshold score; and performing a collection of walks starting with the selected vertex to generate a second far set, wherein the second far set includes all vertices whose score is below the threshold score for the collection of walks started with the selected vertex.

2. The method of claim 1, further comprising:
intersecting the far set with the second far set to generate a current far set that includes an intersection of the far set and the second far set;
selecting a vertex from the current far set; and
performing a collection of walks starting from the vertex selected from the current far set.

3. The method of claim 2, further comprising performing collections of walks from vertices selected from the current far set until the current far set is empty or the dissimilar set includes a predetermined number of vertices.

4. The method of claim 3, maintaining an audit trail identifying efforts made to find a sufficiently diverse dissimilar set of vertices.

5. The method of claim 1, further comprising searching a database for the graph.

6. The method of claim 5, further comprising specifying parameters for searching the database, the parameters including attributes of edges, data type, number of samples to include in the dissimilar set, the threshold value, or combination thereof.

7. The method of claim 1, further comprising creating a relative ranking for the dissimilar set to measure ethical or bias progress.

8. The method of claim 1, further comprising assigning a score of 0 to all vertices never touched by the walk.

9. The method of claim 1, further comprising performing algorithmic training using the dissimilar data set.

10. A non-transitory storage medium having stored therein instructions that are executable by one or more hardware processors to perform operations comprising:
performing a collection of walks in a graph starting from a current vertex, wherein the graph represents a data set;
scoring vertices in the graph based on the collection of walks such that each vertex in the graph has a score, wherein the score of each vertex reflects how often each vertex was visited during the collection of walks relative to the other vertices;
constructing a dissimilar set that includes vertices whose scores are below a threshold score;
outputting the dissimilar set that identifies dissimilar vertices in the graph, wherein the current vertex is included in the dissimilar set;
selecting a vertex from a far set, wherein the far set includes all vertices whose score is less than the threshold score; and
performing a collection of walks starting with the selected vertex to generate a second far set, wherein the second far set includes all vertices whose score is below the threshold score for the collection of walks started with the selected vertex.

11. The non-transitory storage medium of claim 10, further comprising:
intersecting the far set with the second far set to generate a current far set that includes an intersection of the far set and the second far set;
selecting a vertex from the current far set; and
performing a collection of walks starting from the vertex selected from the current far set.

12. The non-transitory storage medium of claim 11, further comprising performing collections of walks from vertices selected from the current far set until the current far set is empty or the dissimilar set includes a predetermined number of vertices.

13. The non-transitory storage medium of claim 12, maintaining an audit trail identifying efforts made to find a sufficiently diverse dissimilar set of vertices.

14. The non-transitory storage medium of claim 10, further comprising searching a database for the graph.

15. The non-transitory storage medium of claim 14, further comprising specifying parameters for searching the database, the parameters including attributes of edges, data type, number of samples to include in the dissimilar set, the threshold value, or combination thereof.

16. The non-transitory storage medium of claim 10, further comprising creating a relative ranking for the dissimilar set to measure ethical or bias progress.

17. The non-transitory storage medium of claim 10, further comprising assigning a score of 0 to all vertices never touched by the walk.

18. The non-transitory storage medium of claim 10, further comprising performing algorithmic training using the dissimilar data set.

* * * * *